ABSORBENT PAPER INDUSTRIAL WIPER OR TOWEL

Original Filed July 6, 1953 2 Sheets-Sheet 1

ABSORBENT PAPER INDUSTRIAL WIPER OR TOWEL

Original Filed July 6, 1953 2 Sheets-Sheet 2

United States Patent Office

Re. 27,453
Reissued Aug. 1, 1972

27,453
ABSORBENT PAPER INDUSTRIAL WIPER OR TOWEL

Richard W. Schutte, Kenneth W. Britt, and Albert L. McConnell, by Scott Paper Co., assignee Original No. 2,834,809, dated May 13, 1958, Ser. No. 366,108, July 6, 1953. Application for reissue May 28, 1971, Ser. No. 147,850
Int. Cl. D21b *5/00;* D21f *11/00, 13/00*
U.S. Cl. 162—117 7 Claims

Matter enclosed in heavy brackets [ ] appears in the original patent but forms no part of this reissue specification; matter printed in italics indicates the additions made by reissue.

The present invention relates to paper and particularly to absorbent paper for use as towels, wipers and the like.

An object of the present invention is to provide paper, sheets of which are suitable for use as industrial wipers.

Another object of the present invention is to provide an inexpensive, disposable substitute for cloth industrial wipers and cotton waste.

Another object is to provide a non-woven industrial wiper.

Another object of the present invention is to provide a strong paper sheet having a high affinity for oils and greases.

Another object of the present invention is to provide an inexpensive, formed paper which rapidly absorbs fluids, especially oils and greases, which is resilient, has substantial bulk, has an effective wiping surface and has high fluid-holding capacity.

Another object of the present invention is to provide an industrial wiper which may be produced inexpensively at high speeds on a paper-making machine.

Another object is to provide a clean and sanitary industrial wiper.

Another object is to provide a multi-ply, paper industrial wiper having the plies interconnected.

Further objects will be apparent by reference to the appended specification, claims and drawings.

Disposable sheets of paper have long been utilized as facial tissues, towels and handkerchief substitutes or the like for personal use. Similarly, absorbent paper has long been used to blot ink, and other papers have been used as porous filters. Although there has long been a need for a strong, disposable and relatively inexpensive paper product to replace the woven or knitted fabric wiping cloths or cotton waste used in industry, none of the aforementioned paper products are satisfactory.

Industrial wiping cloths as referred to herein are generally small, square or rectangular sheets of fabric (approximately 6" x 9", for example) woven or knitted of absorbent yarn. Industrial wipers are generally used in large numbers in factories, machine-shops, etc., to remove oil or grease from machinery, and are used by machinists or others working in industrial plants to clean the hands and face, and are also used to remove foreign material such as metal fragments, splinters or chips from the work-area of machines, such as lathes, grinders, milling machines and the like.

The use of knitted or woven cloths as industrial wipers has a number of disadvantages. They are expensive and, to justify the initial expense, must be used repeatedly or for a long time and hence require periodic cleaning. The periodic cleaning increases the cost of using the wipers and, moreover, it has been found that the periodic cleaning of such cloths does not completely remove foreign matter and bacteria which become incorporated in the fabric, and such foreign matter is then carried to the surface to be wiped with resultant scratching of the machine-surface or injury to the hands and face of the person using the supposedly clean cloth.

Cotton waste is likewise relatively expensive and due to the impracticability of cleaning it, it is usually discarded after it has become soiled.

Facial tissues and paper towels have been used as industrial wipers, without success, because the paper tissues or towels have not been sufficiently oil-absorbent or grease-absorbent and have not had sufficient tensile strength or bulk to provide an effective and economical wiper for heavy duty use in industry.

The present invention provides, for the first time, a clean, economical and safe disposable industrial wiper having high affinity for oil and grease, which wiper is strong in both machine direction and cross-machine direction and which has sufficient caliper or bulk to provide a generally thick sheet so that the person using a single sheet of the product is satisfied with the "feel" thereof and is not tempted to use a plurality of sheets for a single cleaning operation when a single sheet would suffice.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

The absorbent paper or wiper 20 of the present invention preferably is formed from base-stock 21 which has high wet-strength and is highly absorbent, and such base-stock may be the paper-stock used in the manufacture of paper hand towels or the like. Although base-stock 21 similar to that used in the manufacture of paper hand-towels has been found to be satisfactory, it is not intended to limit this disclosure to paper using hand-towel base-stock, but any base-stock having suitable and desirable characteristics may be incorporated in the manufacture of absorbent paper of the present invention.

A good product for use as an industrial wiping tissue is obtained from long-fibre base-stock weighing approximately 16 pounds per ream and which is strong and porous. For example, a paper substantially free from sizing and formed of kraft, sulfite or groundwood stock may be used and the base-stock should preferably be creped before being formed according to the present invention. Preferably the base-stock should also contain a wet-strengthening agent.

Figure 5:
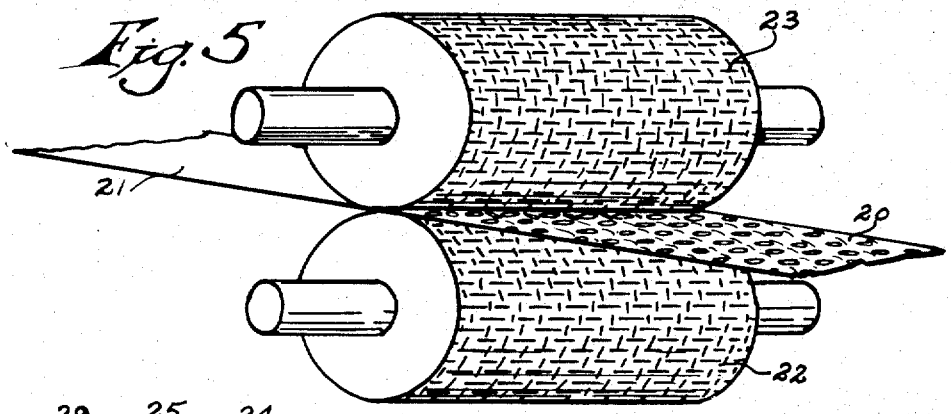
FIGURE 5 is a perspective view of a pair of juxtaposed forming rolls which may be used to produce the sheet of absorbent paper shown in FIGURE 2.

The base-stock 21 is passed through a press or forming machine which may be similar to the machine illustrated in FIGURE 5. This machine includes a lower roll 22 and an upper roll 23, each rotatably mounted on its own axis and supported in juxtaposition to the other roll. The rolls 22 and 23 preferably are interconnected (as through suitable gears, not shown) so that they rotate in synchronism.

It is preferred that the upper roll 23 be supported whereby the surface thereof is in spaced relation to the surface of the lower roll 22 (the gap being a few thousandths of an inch, more or less) so that the rolls do not come in contact, whereby to reduce wear on the roll-surface and prevent the entire surface of the base-stock from being compressed.

The rolls 22 and 23 are designed generally to compress a predetermined amount of the surface area of the base-stock and to stretch portions of the base-stock between the compressed areas beyond the elastic limit of the base-stock whereby more or less to separate the fibres from one another and thereby increase the porosity of the base-stock. The compressed area is less than 50% of the total paper-area and preferably is approximately 10%. The rolls 22 and 23 are not smooth but each is formed with a generally nubby surface comprised of many projections and depressions. The projections may be formed by machining or engraving the roll-surfaces, or may be provided by wrapping a screen of wire mesh around a smooth cylindrical roll or in any other suitable manner. Rolls formed by wrapping wire-screen around a smooth cylindrical roll have been found to be satisfactory. An operative wire screen has a 12 x 12 mesh and is made of wire .047 inch in diameter, but screen of other mesh and wire-diameter may be used. For instance, the mesh may vary from a mesh of 6 x 6 to 24 x 24 with wire-diameter ranging from .023" to .072". Each roll thus formed has a plurality of spaced high spots 24 and intervening depressions 25; the high spots on one roll being generally in alignment with the depressions on the other roll. *The aforementioned 12 x 12 mesh wire pattern provides 72 projections, or high spots 24, per square inch of roll surface and a like number of depressions 25 in the same area. The aforementioned mesh range of 6 x 6 to 24 x 24 inherently provides from 18 to 288 projections per square inch of roll surface.*

The amplitude of the undulations in each roll is greater than the thickness of the base-stock 21 and when the base-stock is fed between the rolls, it is pushed by the high spots on one roll into the depressions on the other roll.

In one embodiment (illustrated in FIGURE 6) the clearance between the crest of each high spot 24 and the bottom of the juxtaposed depression 25 exceeds the thickness of the base-stock 21 and the base-stock is not compressed in these areas. However, along the slopes of the undulations of the so-deformed paper 20 the base-stock is stretched beyond its modulus of elasticity and is deformed as shown in the drawings.

The stretching referred to above may, in some cases, exceed the tensile strength of the paper and tearing or shredding of the paper will occur and apertures 26 will appear in the paper. The apertures 26 preferably are defined by fibrous strands 27 and not by sharp shear-lines. These fibrous strands 27 attract fluid into the paper-body and increase the absorbency of the paper as well as the rate of absorbency of the paper.

It is to be understood that shredded fibers 27 adjacent the apertures 26 are not indispensable because a multitude of so-formed narrow slits or apertures will attract and hold fluid therein by capillary action, and this is the case even if the apertures are defined by straight, clean edges (as when the base-stock 21 is sheared by a sharp instrument).

It is desired that the clearance between the surface of the rolls in the areas to be shredded be less than the thickness of the base-stock so that in these areas the juxtaposed rolls grind or crush the fibers and shred the paper as by a tearing action.

Figure 6:
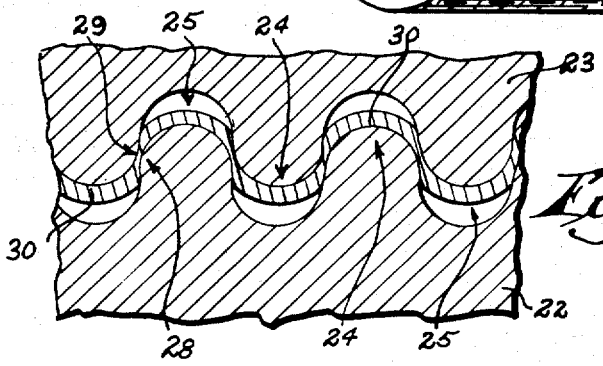
FIGURE 6 is a fragmentary, enlarged cross-sectional view taken generally along a plane extending through the axis of the rolls shown in FIGURE 5.

FIGURE 6 is a cross-sectional view taken generally along a plane extending through the axis of the rolls 22 and 23 and illustrates a roll-formation which causes the shredding action referred to above. In this figure the base-stock 21 is disposed between the rolls 22 and 23, and a portion 28 of the roll 22 acts upon the base-stock between itself and that portion of the roll 23 indicated by the reference numeral 29.

Intermediate the deformed or torn areas 26, in the areas generally indicated by the numerals 30, the rolls 22 and 23 do not crush the base-stock but push it into the aforementioned depressions 25.

Figure 3:
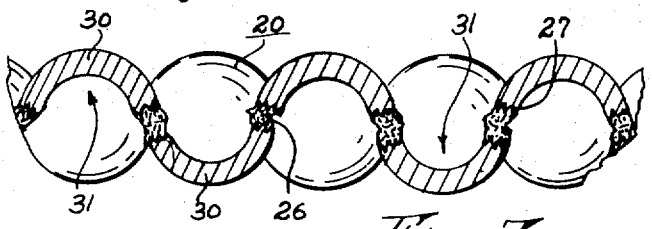
FIGURE 3 is an enlarged cross-sectional view taken generally along line 3—3 of FIGURE 2.
Figure 8:
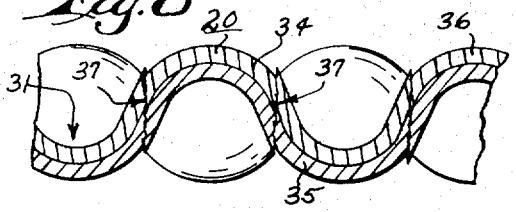
FIGURE 8 is a cross-sectional view, similar to FIGURES 3 and 4, of one embodiment of a 2-ply wiper.

As shown in FIGURES 3 and 8, the paper 20 is thus deformed so as to have a plurality of cup-like recesses 31 in each side thereof. The paper between the areas 30 and extending generally transversely to the plane of the paper-sheet along the "slopes" of the undulations is crushed or stretched beyond the elastic limit, preferably in excess of the tensile strength of the paper. The base-stock 21 remains highly absorbent because the greater portion thereof (in the areas 30) has not been compressed. Moreover, the absorbency of the paper 20 is greatly increased because the apertures 26 provide cup-like recesses or repositories 31 for additional fluid and adits through which fluid is drawn rapidly into the base-stock 21 by the frayed edges 27.

The cup-like recesses 31 provide many relatively small "scoops" in each surface of the paper 20 which scrape the fluid from the surface being cleaned into the apertures 26 where it is rapidly absorbed by the fibers of the paper.

The apertures 26 are formed in that portion of the paper which extends generally transversely to a plane touching the crests 30 of the undulations of the paper, and inasmuch as there are no apertures in the crest-portions 30, a wiper is formed which provides a protective barrier between the hand of the user and metal filings, shavings or the like on the surface of the article being cleaned. The apertures are generally hidden and imperceptible when the paper is viewed at an angle of substantially 90° to the plane of the sheet of the paper and because of the position of the apertures in the sheet are generally visible only when the sheet is viewed obliquely to the plane thereof.

The crests referred to above include the areas of the product moved farthest to each side of the original plane of the base-stock. The depressions on one side of the paper correspond to crests on the other side, and hence when viewed from either side of the paper the apertures 26 appear between adjacent crests and depressions, whereas if the paper is considered in cross-section, the apertures appear between adjacent crests (one of said adjacent crests appearing on each side of the paper).

Because the base-stock 21 is stretched beyond its modulus of elasticity in an area extending generally transversely to the plane of the paper, it does not return to its original flat state after passing through the forming machine but remains deformed and retains the undulating cross-section illustrated in FIGURE 3. Thus there is provided paper having high caliper and high bulk and other desirable physical characteristics and which also has a desirable psychological effect upon the user who takes a single sheet for the same type of wiping operation on which he formerly used many sheets.

The paper of the present invention is characterized by having a high compressibility factor. That is to say, the ratio of the caliper or overall thickness of the product (measured from the crests on one side to the crests on the other side) in an uncompressed state, to the product thickness after pressure is applied, is substantially high. For instance, paper of the present invention may be approximately .028 inch thick under substantially no pressure and after compression at 2 pounds per square inch it is reduced in thickness to approximately .006 inch. Thus the compressibility ratio is approximately 4½ to 1. This is substantially greater than the compressibility of the base-stock alone which, at a pressure of 2 pounds per square inch, is reduced from approximately .009″ to approximately .0055″.

Figure 4:
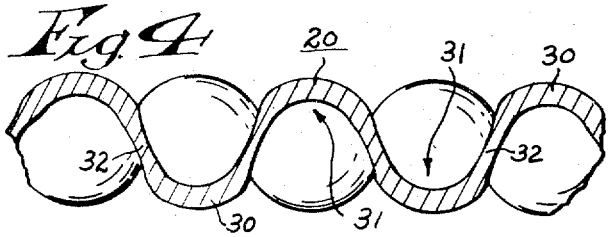
FIGURE 4 is a cross-sectional view, similar to FIGURE 3, showing a modified form of the absorbent paper of the present invention.

The paper 20, illustrated in FIGURE 4, is similar to the paper heretofore described but differs in that the generally transverse portions 32, similar to the portions 26, are not ruptured but are merely stretched beyond the modulus of elasticity. In the areas 32 the paper, being generally elongated, is web-like, that is the areas 32 have myriad small apertures caused by separation of the fibers. This greatly increases the absorbency of the base-stock 21.

The areas 26 or 32 may be of any shape desired but it is preferred that they be generally elongated and relatively small and extend generally in a machine-direction and across a plurality of crepes or folds of the creped base-stock. If the slits are disposed in machine-direction the cross-machine stretch of the paper is increased and a highly desirable structure having two-way stretch is produced. However, in paper having this structure the cross-machine tensile strength is somewhat reduced. If the areas 26 or 32 are disposed in a cross-machine direction, the cross-machine strength is increased but such structure has very little cross-machine stretch.

Although the paper-contacting surfaces of the machine illustrated in the drawings are generally similar to a screen-surface, it is to be understood that the surfaces may be formed with any suitable or desirable pattern and need not be limited to the pattern illustrated in the drawings.

Figure 1:
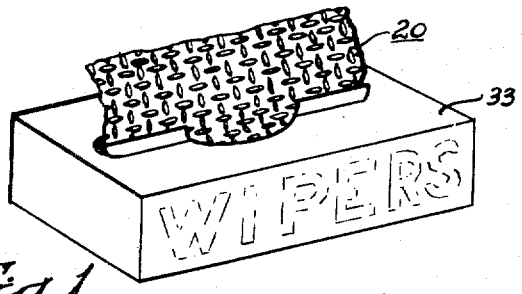
FIGURE 1 is a perspective view of absorbent paper of the present invention and a dispenser-carton therefor.
Figure 2:
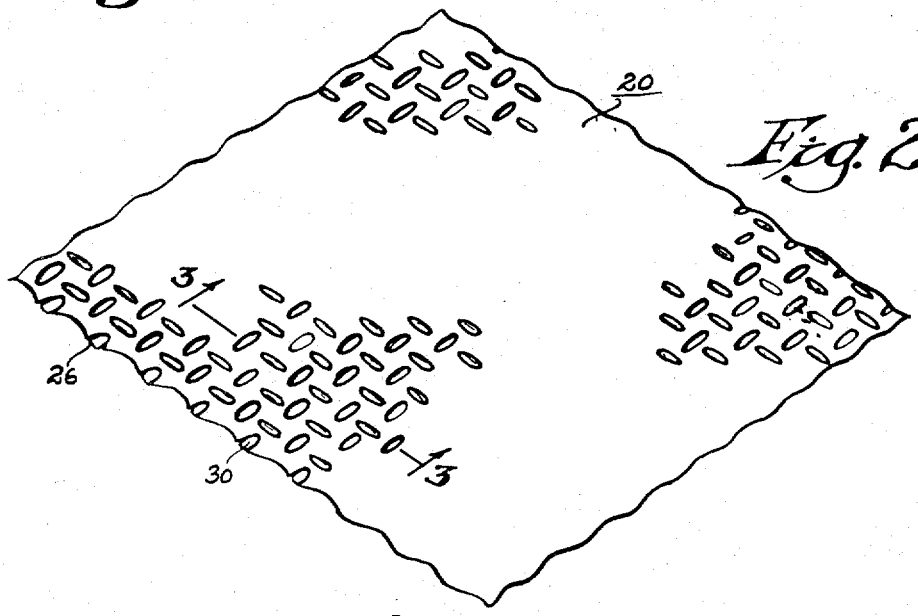
FIGURE 2 is a perspective view of a sheet of absorbent paper which is one embodiment of the present invention.

The paper 20 of the present invention may be cut into sheets of suitable size and packed in dispensers 33, as illustrated in FIGURE 1, for retail sales and consumer use.

Figure 9:
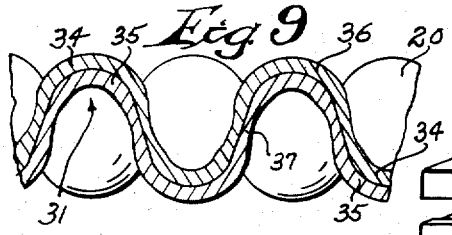
FIGURE 9 is a cross-sectional view similar to FIGURE 8 of another embodiment of a 2-ply wiper.
Figure 7:
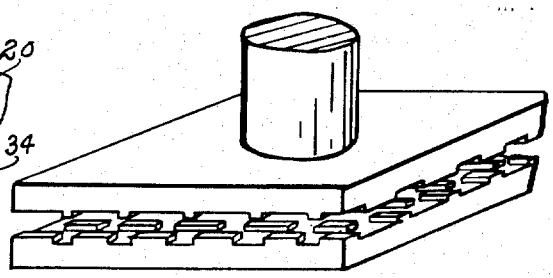
FIGURE 7 is a perspective view of a set of flat engraved dies which may be used to produce the paper sheets shown in FIGURE 2.

Although a single-ply paper-wiper has been referred to above, it is to be understood that multi-ply wipers may be formed by passing simultaneously, a plurality of superimposed sheets of base-stock 21 through the rolls 22 and 23. This produces a highly advantageous multi-ply wiper illustrated in FIGURES 8 and 9. In each of the plies 34 and 35 there are uncompressed portions 36 which occupy the greatest portion of the area of the sheet. Intervening the uncompressed portions 36 there are generally transverse portions 37 wherein the paper has been contacted by the forming rolls and wherein the tearing or crushing referred to above takes place. In the multi-ply sheets, the action of the rolls upon the paper in the areas 37 forces the fibers of one ply closely into contact or engagement with the fibers of the adjacent ply so as to weld the two plies together along the generally transverse portions between the uncompressed portions 36.

The adherence of the adjacent plies to each other in the areas 37 may be by a mechanical interlock between the fibers of the adjacent plies or because the fibers have been so highly calendered between the juxtaposed rolls as to become an almost homogeneous mass in the weld-area.

Because of the interlocking of the fibers of the adjacent plies in the transversely extending portions of the sheet, the multi-ply wiper retains its high bulk and remains in the deformed state. Moreover, paper formed in this manner has exceedingly high resiliency because, after being compressed, it will tend to return to its former state.

FIGURE 8 illustrates a multi-ply wiper formed as above described wherein the areas 37 have been shredded or torn and thus a mechanical interlock is provided between the plies. In the embodiment illustrated in FIGURE 9, the plies are not torn in the area 37 but are so highly compressed as to become "welded" together whereby to retain the plies in the deformed condition. It is to be understood that the total area of the "welds" referred to above is so small relative to the total area of the paper-sheet as to have little or no effect on the absorbency of the paper. Moreover, weld-areas may be formed in other portions of the paper (as, for instance, at the crests of the undulations) without adversely affecting the absorbency of the paper while bonding the plies together.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described our invention, what we claim as new and desire to protect by Letters Patent is the following:

[1. The method of forming paper which comprises supporting a pair of opposed pattern rolls adjacent each other, each roll having substantially the same pattern as the other roll formed on the surface thereof so as to present high and low areas on said surface with sloping areas between the high and low areas, the high areas on one roll extending into the low areas on the other roll in a manner which permits the surface of one roll to come close to the surface of the other roll only in at least some of the sloping areas between the high and low areas, passing a web of paper between the rolls whereby the paper is shaped in a generally nubby pattern having a generally undulating cross-section, sloping areas opposite each other on the two rolls being closer together than the caliper of the web of paper, the rolls working the paper in the sloping areas between some of the high and low areas of the undulations, the rolls leaving unworked substantial areas of said paper.]

2. The method of forming bulky *and absorbent* paper *wipers or towels* from *creped paper* base stock which method comprises [supporting] *utilizing* two rolls having *formed thereon* substantially identical patterns [including high and low areas formed thereon] *of alternating projections and depressions, supporting said rolls for rotation* in juxtaposition so that the [high areas on one roll] *projections on one roll* extend into the [low areas] *depressions* on the other roll and so that the distance between the surfaces of the rolls is less than the thickness of the base stock only in *at least some of* the sloping areas intervening the [high and low spots] *projections and depressions* on each roll, [and] *continuously* passing the base stock between the *rotating* rolls to deform the [paper] *base stock to the pattern of the rolls* and to work [it] *the base stock* beyond [the] *its* elastic limit [of the paper in the said sloping areas between the high and low spots on the rolls,] *between said some sloping areas on the rolls and rupture the base stock only in said some sloping areas, leaving frayed fibrous strands of paper protruding from the ruptures,* while leaving [undeformed substantial] *unruptured substantially all of the remaining* areas of said [paper] *base stock.*

3. [Paper] *A disposable absorbent paper wiper or towel product formed of creped paper base stock and* having a plurality of crests and depressions in each side thereof, the depressions in one side forming the crests on the other side and the crests on one side forming depressions in the other side [,] *and providing the product with an undulating cross-section and a caliper substantially greater than the thickness of the base stock, there being between 18 and 288 crests per square inch on each side of the product and* sloping connecting portions intervening *adjacent* crests and depressions, the [paper] *product* being *further characterized by being* ruptured in *some of the* areas which form said sloping connecting portions, [said paper including substantial areas which are not ruptured] *and*

*having substantially no ruptures in other areas of the product.*

[4. Paper having a plurality of crests and depressions in each side thereof, the depressions in one side forming the crests on the other side and the crests on one side forming depressions in the other side, sloping connecting portions intervening crests and depressions, the paper being working beyond the elastic limit in areas which form said sloping connecting portions, said paper including substantial areas which are not worked beyond the elastic limit.]

[5. Paper having a plurality of crests and depressions in each side thereof, the depressions in one side forming the crests on the other side and the crests on one side forming depressions in the other side, sloping connecting portions interventing crests and depressions, the paper being compressed in areas which form said sloping connecting portions, said paper including substantial areas which are not compressed.]

[6. Paper having a plurality of crests and depressions in each side thereof, the depressions in one side forming the crests on the other side and the crests on one side forming depressions in the other side, sloping connecting portions intervening crests and depressions, the paper having apertures in areas which form said sloping connecting portions, said paper including substantial areas which have no apertures therein.]

[7. The paper recited in claim 3 wherein the ruptured areas appear in the slopping connecting portions between most nearly adjacent crests and depressions.]

[8. The paper recited in claim 4 wherein the areas in which paper is worked beyond its elastic limit appear in the sloping connecting portions between most nearly adjacent crests and depression.]

[9. The paper recited in claim 5 wherein the compressed areas appear in the sloping connecting portions between most nearly adjacent crests and depressions.]

[10. The paper recited in claim 6 wherein the apertured areas appear in the sloping connecting portions between most nearly adjacent crests and depressions.]

[11. The paper recited in claim 3 wherein said paper consists of at least two plies interconnected at a plurality of connecting portions.]

[12. The paper recited in claim 4 wherein said paper consists of at least two plies interconnected at a plurality of connecting portions.]

[13. The paper recited in claim 5 wherein said paper consists of at least two plies interconnected at a plurality of connecting portions.]

[14. The paper recited in claim 6 wherein said paper consists of at least two plies interconnected at a plurality of connecting portions.]

[15. A sheet of the paper recited in claim 3, wherein said sheet is generally undulating in cross-section and has substantially greater caliper than the caliper of the base-stock from which said sheet was formed, said sheet being compressible and having a compressibility factor of at least 2 to 1 at a pressure of two pounds per square inch.]

[16. A sheet of the paper recited in claim 4, wherein said sheet is generally undulating in cross-section and has substantially greater caliper than the caliper of the base-stock from which said sheet was formed, said sheet being compressible and having a compressibility factor of at least 2 to 1 at a pressure of two pounds per square inch.]

[17. A sheet of the paper recited in claim 5, wherein said sheet is generally undulating in cross-section and has substantially greater caliper than the caliper of the base-stock from which said sheet was formed, said sheet being compressible and having a compressibility factor of at least 2 to 1 at a pressure of two pounds per square inch.]

[18. A sheet of the paper recited in claim 6, wherein said sheet is generally undulating in cross-section and has substantially greater caliper than the caliper of the base-stock from which said sheet was formed, said sheet being compressible and having a compressibility factor of at least 2 to 1 at a pressure of two pounds per square inch.]

*19. The method of claim 2 wherein there are between 18 and 288 projections per square inch on each of said rolls.*

*20. The method of claim 2 wherein two plies of base stock are simultaneously passed between the said rolls and the plies are interconnected in areas where the plies are ruptured.*

*21. The disposable absorbent paper product recited in claim 3 wherein said product consists of at least two plies interconnected in the areas which are ruptured.*

*22. The disposable absorbent paper product recited in claim 2, wherein the ruptures are elongated generally in the machine direction of the base stock from which the product is made.*

*23. The disposable absorbent paper product recited in claim 3 wherein there are about 72 crests on each side of the product.*

References Cited

The following references, cited by the Examiner, are of record in the patented file of this patent or the original patent.

UNITED STATES PATENTS

| | | | |
|---|---|---|---|
| 1,957,913 | 5/1934 | Smith | 162—111 |
| 2,257,429 | 9/1941 | Ruegenberg | 156—296 X |
| 2,281,945 | 5/1942 | Milliken | 162—114 |
| 2,502,112 | 3/1950 | Walker | 156—204 |
| 2,537,026 | 1/1951 | Beugger | 156—470 |
| 2,370,186 | 2/1945 | Oldofredi | 162—140 X |
| 118,204 | 8/1871 | Crane | 162—140 X |

HOWARD R. CAINE, Primary Examiner

U.S. Cl. X.R.

156—204; 162—111, 114, 116